(12) United States Patent
Mauderer et al.

(10) Patent No.: US 9,376,059 B2
(45) Date of Patent: Jun. 28, 2016

(54) METHOD FOR PRESENTING AN IMAGE IN A VEHICLE

(75) Inventors: Hans-Peter Mauderer, Gaggenau (DE); Klaus Huebner, Pforzheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 877 days.

(21) Appl. No.: 13/213,860

(22) Filed: Aug. 19, 2011

(65) Prior Publication Data

US 2012/0044337 A1   Feb. 23, 2012

(30) Foreign Application Priority Data

Aug. 19, 2010   (EP) .................................... 10173373

(51) Int. Cl.
*H04N 7/18* (2006.01)
*B60R 1/00* (2006.01)

(52) U.S. Cl.
CPC ............. *B60R 1/00* (2013.01); *B60R 2300/306* (2013.01); *B60R 2300/8006* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 2010/0103204 A1* | 4/2010 | Shibata et al. | 345/690 |
| 2010/0123781 A1* | 5/2010 | Shimura | 348/164 |
| 2010/0194596 A1* | 8/2010 | Wang et al. | 340/936 |
| 2010/0194890 A1* | 8/2010 | Weller et al. | 348/148 |
| 2011/0202862 A1* | 8/2011 | Kramer et al. | 715/771 |
| 2012/0120239 A1* | 5/2012 | Hutzel et al. | 348/143 |
| 2013/0250083 A1* | 9/2013 | Haley | 348/77 |

FOREIGN PATENT DOCUMENTS

| | | |
|---|---|---|
| DE | 10234824 | 2/2004 |
| DE | 202008012289 | 12/2008 |
| WO | 2005021314 | 3/2005 |
| WO | 2005039926 | 5/2005 |

* cited by examiner

*Primary Examiner* — William C Vaughn, Jr.
*Assistant Examiner* — Eileen Adams
(74) *Attorney, Agent, or Firm* — O'Shea Getz P.C.

(57) ABSTRACT

A motor vehicle virtual vanity mirror display system includes an a input device that provides a virtual vanity mirror control signal, and a camera that is adapted to capture an image of an occupant sitting on a seat of the vehicle in response to the virtual vanity mirror control signal. An image processing unit receives the image and processes the image to provide a processed image, and a display receives and displays the processed image to the occupant, in the absence of a vehicle mounted vanity mirror.

15 Claims, 2 Drawing Sheets

METHOD FOR PRESENTING AN IMAGE IN A VEHICLE

CLAIM OF PRIORITY

This patent application claims priority from EP Application No. 10 173 373.1 filed Aug. 19, 2010, which is hereby incorporated by reference.

FIELD OF TECHNOLOGY

The present invention relates to the field of motor vehicle passenger compartment electronics, and in particular to a passenger compartment camera that captures an image of a vehicle occupant and presents the captured image on a display located in the passenger compartment to provide a controllable virtual vanity mirror.

RELATED ART

In modern vehicles, for example cars and trucks, an increasing number of devices are incorporated to increase safety, comfort, and convenience. In this context driver assist systems are used to monitor the attentiveness of the driver, for example, by monitoring the eye activity of the driver with a camera and processing system. In addition, high resolution color displays are mounted or integrated in the vehicle, for example in a dashboard, to provide vehicle data, navigation information or entertainment data, such as for videos or games.

Vehicles often include a plurality of vanity mirrors so the vehicle driver or passengers may observe themselves in a mirror, for example to check make-up, hair, et cetera. There is a great demand in the vehicle industries to reduce costs and weight of the vehicles. There is a need for a system and method that allows a vehicle driver or passenger to see an image of themselves without having to use one or more vanity mirrors.

SUMMARY OF THE INVENTION

According to an aspect of the present invention, an image of an occupant sitting on a seat of the vehicle is captured and the image is automatically displayed to the occupant on a display of the vehicle. The image may be captured with a camera that is incorporated in the vehicle and also capturing images of an inside of the vehicle for a driver assist system. The display may be a display that is also used to selectively provide navigation information, entertainment data or vehicle control system information. The display may be mounted in a dashboard of the vehicle.

By capturing an image of a selected vehicle occupant on the seat of the vehicle and displaying this image on a display in the dashboard of the vehicle to the occupant, a commonly used vanity mirror (e.g., located in a sun visor or headliner) is not necessary and can be omitted from the vehicle interior. Furthermore, illumination for the vanity mirror and a related electrical switching for the illumination can also be omitted. Therefore, cost of the vehicle can be reduced and the weight of the vehicle also reduced.

The captured image may be processed before it is displayed so it is adapted to the needs of the occupant. For example, control information defining a scaling factor may be input by the occupant via a corresponding control element, and the image is automatically scaled in response to the scaling factor. Thus, the occupant can enlarge a certain area of the image or scale down the image. Additional control elements may also be provided to select the area to be displayed or for adjusting brightness of the displayed image. Especially because of the possibility to enlarge the image, an additional comfort can be provided to the occupant compared to the traditional vanity mirror in the sun visor. The processing of the captured image may furthermore comprise generating a mirror image of the captured image. That is, rather than presenting the captured image directly as it is seen by the camera, the captured image may be presented reversed left to right, such that it appears to the occupant as a mirror reflection similar to what would be seen if a physical vanity mirror was being used.

The camera may be housed with the display or adjacent to the display, for example above or beside the display. For example, the camera may be arranged, such that its optical axis is in general perpendicular to a display surface of the display. By arranging the camera near the display and perpendicular to the display surface parallax errors can be avoided. Furthermore, when the display is mounted in the middle of the dashboard or a center console of the vehicle with the camera being arranged in or adjacent to the display an image of the driver as well as of another front seat passenger or co-driver can be selectively captured with one camera. This allows the camera to be used substantially simultaneously for monitoring the driver's attentiveness and for capturing an image of a vehicle passenger reproduction on the display.

The display may be a so-called dual view display that displays a first image in the direction of a driver seat of the vehicle, and a second image in the direction of the front passenger seat of the vehicle. Such dual view displays are commonly used in vehicles to display information independently for the driver and the co-driver. The first image may comprise for example of navigation system information or a vehicle control system information, whereas the second image may comprise vehicle entertainment system information, for example a video or a game, or may comprise the image captured by the camera (e.g., an image of the passenger). The first image may comprise a captured image of the driver. For safety reasons displaying the first image to the driver may be restricted to certain driving situations (e.g., when the vehicle is not moving). The information displayed as the first image and the second image may be user-selectable via corresponding input control elements. Notably, a system according to the present invention may be used as a replacement for the mirrors in the sun visors and/or the headliner of the vehicle.

The image may be displayed in real-time on the display, so the driver or passenger will not recognize any difference between the image that would be presented by an actual vanity mirror and the virtual mirror image displayed on the display according to aspect of the invention. Input control elements may be provided to command the freezing of the displayed image thus allowing the driver or passenger to make a snapshot of the captured image at a selected time, and to take a closer look at this snapshot image thereafter.

The vehicle display system may comprise a camera that captures an image of a selected occupant inside the vehicle, a processing unit that receives and processes the captured image, and a display that receives and displays the processed image. The processing unit may selectively generate a mirror image of the image or scale the image in response to a scaling factor input to the processing unit to set the scaling factor. In addition to capturing images for the virtual vanity mirror display system, the camera may also be used by a driver assist system of the vehicle for monitoring the attentiveness of the driver. The camera may be arranged with the display or adjacent to the display, such that the optical axis of the camera is in general perpendicular to a display surface of the display.

The display also may be used by a navigation system, a vehicle entertainment system or a vehicle control system for displaying information of these systems. The display may be a so-called dual view display which is adapted to display a first image information in the direction of a driver seat of the vehicle and a second image information in the direction of another front passenger seat of the vehicle, for example a co-driver seat of the vehicle. The captured image may be displayed as the first image information or as the second image information in the direction of a driver seat or in the direction of a co-driver seat, respectively. The vehicle display system may display video images in real time by the camera. Real time is generally understood to mean that a delay between capturing the image and displaying the image is less than a few hundred milliseconds, and therefore the delay will not perceivable by the viewer.

Although specific features described in the above summary and the following detailed description are described in connection with specific embodiments, it is to be understood that the features of the embodiments can be combined with each other, unless noticed otherwise.

These and other objects, features and advantages of the present invention will become apparent in light of the detailed description of the best mode embodiment thereof, as illustrated in the accompanying drawings. In the figures, like reference numerals designate corresponding parts.

DESCRIPTION OF THE DRAWINGS

The invention will now be described in more detail with reference to the accompanying drawings.

DETAILED DESCRIPTION OF THE INVENTION

Figure 1:
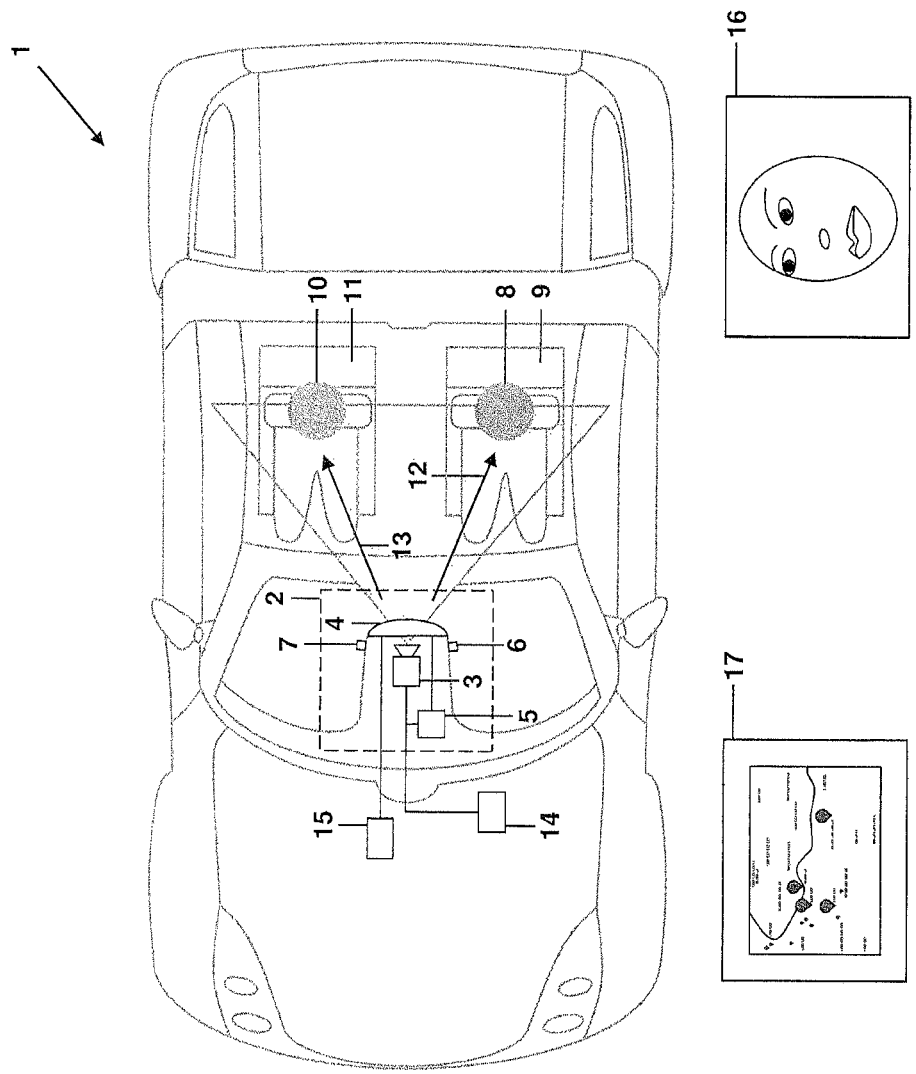
FIG. 1 is a pictorial illustration of a motor vehicle comprising a passenger compartment camera and display system.

FIG. 1 illustrates a vehicle 1 that includes a vehicle display system 2. The system 2 comprises a camera 3, a display 4 (e.g., a single or dual view), a processing unit 5, a first control element 6, and a second input control element 7. The camera, display, processing unit and control element may be connected directly, or via known motor vehicle bus systems (e.g., MOST, CAN, VAN, Flex-Ray, LN, D2B, DC-BUS, TCP/IP, et cetera). The display 4 may be located generally in the center area of a dashboard of the vehicle or in a center console of the vehicle 1 such that it can be viewed by a driver 8 sitting on a driver seat 9 as well a passenger 10 sitting on front passenger seat 11. The dual view display 4 displays two images at the same time, wherein a first of the two images can only be viewed in a first viewing angle or a first viewing angle range, and the second of the two images can only be viewed from a second viewing angle or a second viewing angle range. The first and the second viewing angles or viewing angle ranges are selected such that the first image can be viewed by a person sitting on the driver seat 9, and the second image can be viewed by a person sitting on the other front passenger seat 11. The viewing angle direction of the first image of the dual view display 4 is indicated by arrow 12 and the second viewing angle direction of the dual view display 4 is indicated by arrow 13. Thus, the driver 8 and the passenger 10 may see different content on the dual view display 4.

The camera 3 is positioned to image the faces of the driver 8 and the passenger 10, and may be positioned adjacent to the display 4, for example above the display. Alternatively, the camera 3 may be incorporated in (e.g., housed with) the display 4. An optical axis of the camera 3 may be perpendicular to a display surface of the display 4. The processing unit 5 receives and processes images captured by the camera 3 to display the images on the display 4 in the first display direction 12, in the second display direction 13 or in both display directions 12, 13.

The first control element 6 may receive control information from the driver 8, and the second control element 7 may receive control information from the passenger 10. It is contemplated that control elements 6, 7 may comprise any kind of control elements adapted to receive the control information necessary to control the display system as will be described hereinafter. The control elements may comprise for example rotary knops, push buttons, sliders, or a touch-sensitive surface on the display 4.

The vehicle may comprise a driver assist system 14 that also receives images from the camera 3 to automatically monitor a driver's attentiveness, for example by monitoring the state of the eyes of the driver 8 to determine whether or not they are open. In case the driver assist system 14 recognizes that the driver is not attentive (e.g., due to closed eyes or very slowly moving pupils), a warning is output by the driver assist system 14, for example by activating a steering wheel vibrator or activating a seatbelt retractor or outputting an acoustic or optic warning signal to alert the driver.

The vehicle may comprise additional systems 15, such as for example a navigation system (e.g., GPS), a vehicle entertainment system and/or a vehicle control system, each coupled to provide display information to the dual view display 4. The navigation system may output map information and route guidance information on the display, while the vehicle entertainment system may output video information on the display, and the vehicle control system may output vehicle status information to the driver 8 on the display.

Although the processing unit 5, the driver assist system 14 and the system 15 are shown in FIG. 1 as separate units, these systems may of course be combined in one or more units or may comprise each more than one unit.

Figure 2:
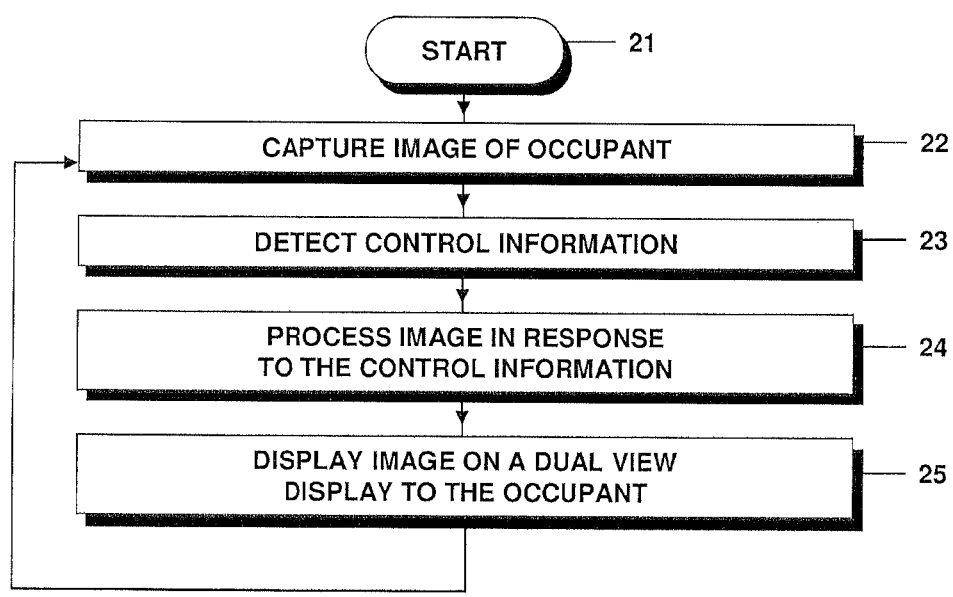
FIG. 2 is a flow-chart illustration of an embodiment of steps to capture, process and display an image according to an aspect of the present invention.

Operation of the vehicle display system 2 will now be described in more detail in connection with FIGS. 1 and 2. With the control elements 6, 7 the driver 8 and/or the passenger 10 may activate a so-called virtual vanity mirror function of the vehicle display system 2. When for example the passenger 10 selects the mirror function via the control element 7, a processor that receives and executes executable program instructions, and may be located for example with the display or the processing unit, executes step 21 (FIG. 2) to initiate the mirror function. In step 22, the vehicle display system commands the camera 3 to capture one or more images of the selected vehicle occupant, such as for example the passenger 10 seated on the passenger seat 11. A signal representing the captured image of the passenger is transferred to the processing unit 5 and the processing unit processes the received image in step 24. The processing is dependent upon the control information received from the passenger via the control element 7 in step 23. The processed image is then passed from the processing unit 5 to the display 4 and displayed by the dual view display 4 in the direction of the passenger in step 25. Capturing, processing, and displaying images may be performed continuously as indicated by the loop in the flow chart of FIG. 2. The control information received via the control element 7 and the corresponding processing will be described by way of examples in the following.

The control information received in step 23 may comprise for example information indicating a section of the captured area that should be enlarged/scaled-up in step 24 to be presented in more detail on the display 4 (FIG. 1). This allows the occupant for example to display only his face or an eye on the display. With the help of the control element 7 additional functions for processing the image may be controlled by the occupant, for example brightness or contrast of the image displayed on the display 4 may be adjustable. Notably, the virtual vanity mirror function of the vehicle display system 2 may replace a make-up mirror(s) or a vanity mirror(s) in a sun visor(s) and/or a headliner of the vehicle. The processing unit may also be adapted to automatically determine a section in the captured image comprising the face of the occupant 10 and crop the image for display of the face over the display surface. In FIG. 1 the passenger 10 then sees on the display 4 for example an image of his or her face as indicated by reference sign 16 in FIG. 1. As capturing, processing and displaying the image may be done continuously and preferably in real time, the passenger 10 may see a live video of his or her face on the dual view display 4. At the same time, the driver 8 may see on the dual view display 4 information of a navigation system 15 of the vehicle 1 as indicated by reference sign 17 in FIG. 1.

When the passenger 10 deactivates the mirror function of the vehicle display system 2, other information may be automatically displayed on the dual view display 4 in the direction of the passenger 10, for example video information from a vehicle entertainment system 15 or the image that was being presented to the passenger prior to the activation of the virtual vanity mirror function.

The control element 6 allows the driver 8 to activate the virtual vanity mirror function for viewing an image of himself on the dual view display 4 in the direction of the driver. Activating this mirror function for the driver may be inhibited during certain driving conditions of the vehicle for safety reasons, such as when the vehicle is moving.

While exemplary embodiments of the invention have been described above, various modifications may be implemented in other embodiments. For example, instead of one camera 3 capturing an image of the driver 8 and the passenger 10, two or more cameras may be incorporated in the vehicle 1 for capturing images of the driver 8 and the passenger 10, respectively. Furthermore, the processing unit may be adapted to generate a mirror image from the captured image.

Finally, it is to be understood that all the embodiments described above are considered to be comprised by the present invention as it is defined by the appended claims.

Although the present invention has been illustrated and described with respect to several preferred embodiments thereof, various changes, omissions and additions to the form and detail thereof, may be made therein, without departing from the spirit and scope of the invention.

What is claimed is:

1. A method for presenting an image in a vehicle, the method comprising the steps of:
   capturing an image of an occupant sitting on a seat of the vehicle;
   generating a mirror image of the image captured of the occupant in the vehicle;
   receiving control information from the occupant defining a scaling factor;
   processing the mirror image in response to the scaling factor to enlarge the image of the occupant in the mirror image and provide a scaled mirror image indicative thereof; and
   displaying the scaled mirror image on a display of the vehicle to the occupant.

2. The method according to claim 1, further comprising processing an image indicative of the captured image to crop the facial region of the occupant in the image such that the facial region of the occupant in the scaled mirror image is cropped in comparison to the captured image.

3. The method according to claim 1, wherein the captured image is captured with a camera.

4. The method according to claim 3, wherein the camera is adapted to be additionally used by a driver assist system of the vehicle for monitoring a driver's attentiveness.

5. The method according to claim 3, wherein the camera is arranged in or adjacent to the display, the camera being arranged such that its optical axis is in general perpendicular to a display surface of the display.

6. The method according to claim 1, wherein the scaled mirror image is displayed on a display of the vehicle selected from the group comprising a navigation system, a vehicle entertainment system and a vehicle control system.

7. The method according to claim 1, wherein the scaled mirror image is displayed on a dual view display adapted to display a first image in the direction of a driver seat of the vehicle and a second image in the direction of another front passenger seat of the vehicle, wherein the mirror image is displayed as the first image or as the second image.

8. The method according to claim 1, wherein the scaled mirror image comprises video and is displayed in real-time on the display.

9. A vehicle display system, comprising:
   a dashboard mounted camera operably positioned to capture an image of an occupant sitting on a seat of the vehicle and provide a captured image onto a bus;
   a processing unit operable to generate a mirror image of the image captured of the occupant in the vehicle;
   an input device coupled to the processing unit, wherein the input device detects control information from the occupant defining a scaling factor; and wherein the processing unit enlarges the image of the occupant in the mirror image based upon the scale factor and provides a scaled mirror image indicative thereof; and
   a dashboard display that receives the scaled mirror image via the bus and displays the scaled mirror image to the occupant.

10. The vehicle display system according to claim 9, wherein the camera is adapted to be additionally used by a driver assist system of the vehicle for monitoring a driver's attentiveness.

11. The vehicle display system according to claim 9, wherein the camera is arranged in or adjacent to the display, the camera being arranged such that its optical axis is in general perpendicular to a display surface of the display.

12. The vehicle display system according to claim 9, wherein the display comprises a display of a system of the vehicle selected from the group comprising a navigation system, a vehicle entertainment system and a vehicle control system.

13. The vehicle display system according to claim 9, wherein the display comprises a dual view display adapted to display a first image in the direction of a driver seat of the vehicle and a second image in the direction of another front passenger seat of the vehicle, wherein the scaled mirror image is displayed as the first image or as the second image.

14. The vehicle display system according to claim 9, wherein the scaled mirror image is displayed in real-time on the display.

15. A motor vehicle virtual vanity mirror display system, comprising:
- an input device that provides a virtual vanity mirror control signal;
- a camera adapted to capture an image of an occupant sitting on a seat of the vehicle in response to the virtual vanity mirror control signal;
- an image processing unit that receives the image captured of the occupant in the vehicle and processes the image captured of the occupant in the vehicle to provide a mirror image;
- a second input device coupled to the to the processing unit, wherein the second input device detects a control information from the occupant defining a scaling factor; and wherein the processing unit enlarges the image of the occupant in the mirror image based upon the scale factor and provides a scaled mirror image indicative thereof; and
- a display that receives and displays the scaled mirror image to the occupant, in the absence of a vehicle mounted vanity mirror.

\* \* \* \* \*